(12) United States Patent
Yamaguchi

(10) Patent No.: US 11,387,018 B2
(45) Date of Patent: Jul. 12, 2022

(54) METHOD OF INSTALLING SUPERCONDUCTING CABLE AND FORMER

(71) Applicant: CHUBU UNIVERSITY EDUCATIONAL FOUNDATION, Kasugai (JP)

(72) Inventor: Sataro Yamaguchi, Kasugai (JP)

(73) Assignee: CHUBU UNIVERSITY EDUCATIONAL FOUNDATION, Kasugai (JP)

(*) Notice: Subject to any disclaimer, the term of this patent is extended or adjusted under 35 U.S.C. 154(b) by 736 days.

(21) Appl. No.: 16/303,272

(22) PCT Filed: May 26, 2017

(86) PCT No.: PCT/JP2017/019727
§ 371 (c)(1),
(2) Date: Nov. 20, 2018

(87) PCT Pub. No.: WO2017/204336
PCT Pub. Date: Nov. 30, 2017

(65) Prior Publication Data
US 2019/0221335 A1    Jul. 18, 2019

(30) Foreign Application Priority Data

May 26, 2016 (JP) .............................. JP2016-105427

(51) Int. Cl.
*H01B 12/00* (2006.01)
*H01B 12/16* (2006.01)
(Continued)

(52) U.S. Cl.
CPC ............. *H01B 12/16* (2013.01); *H01B 12/02* (2013.01); *H02G 1/06* (2013.01); *Y02E 40/60* (2013.01)

(58) Field of Classification Search
CPC .......... H01B 12/16; H01B 12/02; H02G 1/06; Y02E 40/60
See application file for complete search history.

(56) References Cited

U.S. PATENT DOCUMENTS 4,169,964 A * 10/1979 Horvath .................. H01L 39/14
174/15.5
8,173,897 B2    5/2012  Hirose et al.
(Continued)

FOREIGN PATENT DOCUMENTS

| JP | 49-28879 A | 3/1974 |
| JP | 2-26215 A  | 1/1990 |

(Continued)

OTHER PUBLICATIONS

WO 2013/151100 A1 English Translation published on Oct. 10, 2013 (Year: 2013).*

(Continued)

*Primary Examiner* — Pete T Lee
(74) *Attorney, Agent, or Firm* — Sughrue Mion, PLLC

(57) ABSTRACT

When temperature raising is performed, temperature of a superconducting cable is uniformly raised over an entirety of the superconducting cable. The superconducting cable assumes a linear shape when cooled, and deforms into a helical shape when temperature raising is performed. In a former having a twisted wire structure, twisting directions of an outermost layer and a layer next to the outer most layer are set to be the same, enabling stabilization of the helical deformation of the superconducting cable including the former when the temperature raising is performed.

8 Claims, 17 Drawing Sheets

(51) Int. Cl.
*H02G 1/06* (2006.01)
*H01B 12/02* (2006.01)

(56) References Cited

U.S. PATENT DOCUMENTS

| | | | |
|---|---|---|---|
| 8,244,323 | B2 | 8/2012 | Yamaguchi |
| 8,575,790 | B1* | 11/2013 | Ogilvie ............... H02N 15/04 310/12.04 |
| 9,767,941 | B2 | 9/2017 | Yamaguchi et al. |
| 2006/0116292 | A1 | 6/2006 | Kato et al. |
| 2007/0179062 | A1 | 8/2007 | Hirose et al. |
| 2010/0227764 | A1 | 9/2010 | Willén et al. |
| 2010/0285968 | A1 | 11/2010 | Gregory |
| 2011/0136674 | A1 | 6/2011 | Yamaguchi |
| 2016/0260526 | A1* | 9/2016 | Otto ................. H01B 12/10 |
| 2016/0372239 | A1 | 12/2016 | Yamaguchi et al. |

FOREIGN PATENT DOCUMENTS

| | | |
|---|---|---|
| JP | 9-134624 A | 5/1997 |
| RU | 2 313 150 C2 | 12/2007 |
| RU | 2 356 118 C2 | 5/2009 |
| RU | 2 379 777 C2 | 1/2010 |
| WO | 2009/145220 A1 | 12/2009 |
| WO | 2013/151100 A1 | 10/2013 |
| WO | 2015/002200 A1 | 1/2015 |

OTHER PUBLICATIONS

Communication dated Dec. 5, 2019 from European Patent Office in counterpart EP Application No. 17802922.9.
Noriko Chikumoto, et al., "Demonstration studies of high-temperature superconducting DC power transmission system at Ishikari", CSJ Conference vol. 90 (2014). 1B-a06, searched on Mar. 25, 2016, Internet <URL: http://csj.or.jp/conference/2014a/1B.pdf>.
"New Edition-Power Cable Technology Handbook" of second edition supervised by Kihachiro Iizuka, Denkishoin Co., Ltd., pp. 342-343, 2013.
International Search Report for PCT/JP2017/019727 dated Aug. 15, 2017 (PCT/ISA/210).
Communication dated Oct. 14, 2020 by the Federal Institute of Industrial Property in Russian in application No. 2018146035.

* cited by examiner

ASSEMBLY TWISTED WIRES

CONCENTRIC TWISTED WIRES

ROPE-TWISTED WIRES

US 11,387,018 B2

METHOD OF INSTALLING SUPERCONDUCTING CABLE AND FORMER

CROSS-REFERENCE TO RELATED APPLICATIONS

The present invention is a National Stage of International Application No. PCT/JP2017/019727 filed May 26, 2017, based upon and claims the benefit of the priority of Japanese Patent Application No. 2016-105427 (filed on May 26, 2016), the disclosure of which is incorporated herein in its entirety by reference. The present invention relates to a superconducting cable technology, and more specifically, the invention relates to a former and a method of installing a superconducting cable.

BACKGROUND

It is known that, when cooled from room temperature to liquid-nitrogen temperature, a superconducting cable thermally contracts by about 0.3%. The longer superconducting cable becomes, the more serious the problem of the thermal contraction becomes. When a superconducting cable is of length 500 m, for example, the thermal contraction becomes 1.5 m. Thus, the superconducting cable may be damaged, destructed, or the like due to breakage at a time of cooling, buckling at a time of temperature raising, or the like. Analysis of X-ray photographs of behaviors of a cable at the times of the cooling and the temperature raising is made at the 200 m experimental facility of the applicant (Chubu University) of the present invention (see Non Patent Literature 1). An overview of helical deformation of a superconducting cable (that partially overlaps with description of Patent Literature 1) will be described. Patent Literature 1 discloses a superconducting cable including a former that includes copper wires and formed by twisting the copper wires (formed to assume a helical shape at room temperature due to processing deformation of the copper wires) and a superconducting wire material wound around an outer layer of the former through an insulating layer and made to be superconductive when the superconducting cable is cooled, wherein at room temperature, the superconducting cable assumes a helical shape where the superconducting cable turns in the longitudinal direction of the superconducting cable, and when cooled, the superconducting cable assumes a linear shape.

FIG. 1 illustrates an example of the 200-m superconducting cable, as a related art. There are three layers of HTS tape (High-Temperature Superconducting tape) wire materials in which inner two layers and an outer layer are coaxially provided. There is a former (a winding core of twisted copper wires) in the center of the 200-m superconducting cable, and a plurality of layers of PPLP (Poly-Propylene Laminated Paper) insulating tape materials are wound outside the former. The 200-m superconducting cable includes two layers of HTS tape wire materials (with a thickness of 0.3 mm and a width of 4 mm), the PPLP insulating tape materials, the HTS tape wire materials (that become an outside electrode of the coaxial superconducting cable), and a PPLP. The 200-m superconducting cable is finished by winding a copper thin film for taking an earth potential (for grounding), and then mounting a protective layer on the copper thin film.

When a superconducting cable is drawn in a thermally insulated double pipe, a method of drawing a former is generally employed. In addition, a method of sandwiching the superconducting cable by a soft tire or the like and pushing the superconducting cable into the thermally insulated double pipe may also be employed together with the above-mentioned method. Hereinafter, an example of the method of drawing the former will be described, for simplicity of the description.

A mechanical behavior of a superconducting cable is determined by a behavior of a former. Generally, the former has a twisted structure of copper wires. In the twisted structure, a residual stress in a twisting direction remains. It is experimentally confirmed that, when a superconducting cable deforms due to a residual stress in a twisting direction, the superconducting cable is formed into a helical shape. Therefore, the superconducting cable deforms in a direction where the residual stress in the twisting direction is relaxed, and as a result, the superconducting cable assumes the helical shape.

It is desirable that substantially no external force is applied to a superconducting cable at room temperature. Further, preferably, at a low temperature, there is no residual stress in the superconducting cable. This is because reduction of a critical current may occur due to the stress. However, generally, a residual stress remains in the superconducting cable in order to draw the superconducting cable into the thermally insulated double pipe. Then, this residual stress is partially relaxed by cooling the superconducting cable into low temperature. This phenomenon will be described below.

FIG. 8 is a diagram schematically illustrating an example of an operation of drawing a superconducting cable 102 into a linear pipe 101. In the example illustrated in FIG. 8, a tensile force F increases as a drawing-in distance of the superconducting cable 102 increases because there is a friction between an inner surface of the pipe 101 and a surface of the superconducting cable 102.

FIG. 9 is a graph describing a relationship between a stress distribution in the superconducting cable 102 and the distance of drawing in the superconducting cable 102 when the superconducting cable 102 is drawn in the pipe 101 (of length $L_0$) in FIG. 8. Referring to FIG. 9, a vertical axis indicates a stress ($\sigma$) in the superconducting cable 102. A horizontal axis indicates a drawing-in distance (length) of the superconducting cable 102 into the pipe 101. $L_0$ on the horizontal axis indicates the length of the pipe 101. A graph (straight line) connecting a point of origin and a point ($L_0$, $\sigma_0$) indicates a friction stress. By integrating each friction stress, a friction resistance is obtained. A large stress ($\sigma_0$) is obtained on a side (with the length $L_0$) from which the superconducting cable 102 is drawn-in using a tensile force F. On the other hand, the tensile force F is zero on a side (with the length=0) from which the superconducting cable 102 is introduced into the pipe 10.1 Thus stress $\sigma$ is also zero. FIG. 9 is confirmed experimentally as well.

From our experimental measurements, it has been found that a friction coefficient between the superconducting cable 102 and the stainless pipe 101 is approximately 0.3 to 0.7. An increase in the stress in proportion to the length indicates that the friction coefficient is uniform in the length direction of the superconducting cable 102. This is also an experimental fact. However, if there is a bent portion in the pipe 101 or the like, the tensile force F drastically increases.

A force when the superconducting cable 102 is drawn in the pipe 101 is referred to description in Non Patent Literature 2 or the like.

Each of superconducting cables mostly weigh 1 kg/m to 5 kg/m. For this reason, a tensile force F becomes a force of one ton or more in a case where the superconducting cable is several hundred m long. This force is applied to the former. Therefore, the length of the superconducting cable than can be drawn in the pipe is determined according to an allowable strength (within elastic deformation) of the former.

After the superconducting cable 102 has been drawn in the pipe 101, a tensile force F is made zero (or the drawing is stopped). Thus, the superconducting cable 102 contracts. Accordingly, a stress of the superconducting cable 102 is also reduced and becomes zero at end portions of the superconducting cable 102.

However, a stress corresponding to a friction force remains in the superconducting cable 102. Therefore, as illustrated in FIG. 10, a stress distribution in the superconducting cable 102 becomes a distribution in which the stress assumes a maximum value (the residual stress=$\sigma_0/2$) a center portion (=$L_0/2$) in a longitudinal direction of the pipe 101, and the stress becomes zero at both ends of the superconducting cable 102. Generally, this state indicates a distribution of a residual stress which is applied to a cable such as a copper cable or the like when the cable is drawn in a pipe.

On the other hand, the superconducting cable is used in a low temperature. Accordingly, a stress state when the superconducting cable is cooled poses a great problem. That is, a stress is newly produced by thermal contraction of the superconducting cable. When the cooling is performed with both ends of the superconducting cable fixed, a thermal stress that is caused by occurrence of the thermal contraction of 0.3% is added to the tensile stress that remains when the superconducting cable has been drawn in the pipe at room temperature. Thus, a stress exceeding a thermal stress corresponding to the thermal contraction of 0.3% will be generated in the superconducting cable. This is extremely dangerous. That is because the material of the former such as copper enters a domain of plastic deformation from a deformation below 0.3%.

In a step subsequent to the helical deformation of the superconducting cable, the superconducting cable is cooled by liquid nitrogen or the like. On this occasion, one end of the superconducting cable is fixed, while the other end is a free end.

Then, the length of the superconducting cable is reduced due to the cooling. Thus, the superconducting cable is drawn in the pipe from a side of the free end.

A stress distribution when the cooling is completed and an entirety of the superconducting cable has a same temperature is illustrated in FIG. 11. Referring to FIG. 11, a vertical axis indicates a stress, and a horizontal axis indicates a length. Regarding graphs in FIG. 11, a graph (1) is a graph in FIG. 10 (stress distribution at the room temperature after the superconducting cable is drawn in the pipe), a graph (2) is a stress distribution of the superconducting cable held at a low temperature, and a graph (3) is a graph indicating a stress distribution when the superconducting cable with no stress at room temperature is cooled and then held at the low temperature.

The examples illustrated in FIG. 11 indicate a sum of the stress distributions wherein cooling is performed when the residual stress and the stress in the superconducting cable are zero and the superconducting cable is drawn in from the free end (this is a distribution associated with that in FIG. 9, but a force direction becomes opposite due to the drawing-in, so that the stress is represented by a negative value).

As illustrated in the graph (2) in FIG. 11, the stress in a half of the superconducting cable from the free end becomes zero. This is an ideal state because no stress acts on the superconducting cable at low temperature.

As illustrated in FIG. 11, the stress in a left half of the superconducting cable remains (on a side of the fixed end in this example), and its maximum value assumes the maximum value (=$-\sigma_0$) of the stress when the cable 102 is drawn in Accordingly, it is desirable to relax this stress (according to findings of the inventor of the present invention).

At low temperature, there is a certain degree of tensile force due to an external force such as a friction, so that the superconducting cable assumes a linear shape. This is confirmed by X-ray photographing. Thus, the residual stress is positively utilized. That is, by configuring the superconducting cable to be helically deformed at room temperature, using the residual stress in the former of superconducting cable and to assume a linear shape at low temperature, a large stress due to the thermal contraction is relaxed.

Generally, the former of a superconducting cable is manufactured by twisting copper wires. When there is a large residual stress in the former, the superconducting cable deforms to relax that residual stress. Thus, the superconducting cable is manufactured so that the residual stress of the superconducting cable is eliminated.

FIG. 2A illustrates a plurality of twisted wire structures. FIG. 2A illustrates sections of assembly twisted wires, concentric twisted wires, and rope-twisted wires. Generally, a twisted wires used for a superconducting cable has a structure referred to as the concentric twisted wires. As seen from an outside, this structure is prepared by twisting wires, as illustrated in FIG. 2B. Generally, a residual stress is generated due to the twisted wires, thereby making it easy for an entirety of the former to be twisted. Thus, in the structure of the concentric twisted wires, a twisting direction for each layer is reversed, thereby preparing the former that is difficult to be twisted as a whole.

However, twisting directions of an outermost layer and a layer next to the outer most layer are set to be the same in order to make the superconducting cable deform into a helical shape in a temperature raising process. This stabilizes a twisting direction of the superconducting cable (leading to a helical deformation). The inventor of the present invention has confirmed this phenomenon by a plurality of experiments.

A residual stress in a twisting direction changes according to machining, a material for a strand, a pitch, heat treatment, or the like. In order to obtain deformation necessary for the superconducting cable, the processing and the material are selected with these conditions put together.

The following describes a superconducting cable installation method, based on the description in Patent Document 1. FIGS. 3A to 3D are diagrams each schematically illustrating a state where a superconducting cable is inserted into a thermally insulated double pipe. Referring to FIGS. 3A to 3D, reference numeral 10 designates an outer pipe of a thermally insulated double-pipe, reference numeral 11 designates an inner pipe of the thermally insulated double-pipe, reference numeral 12 designates a superconducting cable, reference numeral 13 designates a vacuum layer, reference numeral 14 designates a vacuum pump, reference numeral 15 designates a first fixture, reference numeral 16 designates a refrigerant (liquid nitrogen: $LN_2$), and reference numeral 17 designates a second fixture.

Though not limited thereto, the outer pipe 10 of the thermally insulated double-pipe is made of a zinc-galvanized steel pipe or the like, for example. The inner pipe 11 of the thermally insulated double-pipe is formed of a stainless steel pipe, for example. The superconducting cable 12 is disposed inside the inner pipe 11 of thermally insulated double-pipe, and the refrigerant (liquid nitrogen) flows between the superconducting cable 12 and the inner pipe 11 of the thermally insulated double-pipe. A gap (vacuum layer 13) between the outer pipe 10 of the thermally insulated double-pipe and the inner pipe 11 of the thermally insulated double-pipe is sealed airtight in a vacuum state, and vacuum insulation is performed. To cope with heat intrusion by radiation, the vacuum layer 13 includes a multilayer insulation (MLI: MultiLayer Insulation) outside the inner pipe 11 of the thermally insulated double-pipe. The multilayer insulation (MLI) is formed of a lot of layers of films each with aluminum deposited on a plastic film, for example. Referring to each of FIGS. 3A to 3D, the vacuum pump 14 configured to evacuate the gap (vacuum layer 13) between the outer pipe 10 of the thermally insulated double-pipe and the inner pipe 11 of the thermally insulated double-pipe is disposed at both end portions of the thermally insulated double pipe. It may be so configured that the vacuum pump 14 is further disposed at an intermediate portion of the thermally insulated double pipe. The configuration of the thermally insulated double pipe is referred to the description in Patent Literature 2 or the like, for example.

Process A (in FIG. 3A)

The thermally insulated double pipe is assembled along a line. The thermally insulated double pipe is evacuated (i.e., the vacuum layer 13 is evacuated). Thermal insulation performance of the thermally insulated double pipe is checked. The superconducting cable 12 is drawn into the inner pipe 11 of the thermally insulated double-pipe.

Process B (in FIG. 3B)

The superconducting cable 12 is inserted into the inner pipe 11 of the thermally insulated double-pipe. One end of the superconducting cable 12 is fixed by the first fixture 15 after it has been confirmed that the superconducting cable 12 sufficiently comes out from both ends of the thermally insulated double pipe. On this occasion, the other end of the superconducting cable 12 is not fixed. The first fixture 15 may be the one configured to fix the one end of the superconducting cable 12 to the thermally insulated double-pipe.

Then, the refrigerant (liquid nitrogen) 16 is introduced into the inner pipe 11 of the thermally insulated double-pipe. The refrigerant (liquid nitrogen) 16 may be introduced into the thermally insulated inner pipe 11 from a refrigerant inlet port provided at a central portion in the longitudinal direction of the thermally insulated double-pipe (see Patent Literature 1). With the introduction of the refrigerant (liquid nitrogen) 16, the superconducting cable 12 starts thermal contraction. The non-fixed end side of the superconducting cable 12 is drawn in toward the inner pipe 11 of the thermally insulated double-pipe. On this occasion, it may be so arranged that a temperature distribution in the superconducting cable 12 is measured, and a length and a load of the superconducting cable 12 on the non-fixed end side (end portion opposite to the first fixture 15) that is drawn in the thermally insulated double-pipe, may be measured by a load cell or the like, for example.

Process C (in FIG. 3C)

The non-fixed end side of the superconducting cable 12 is fixed to the second fixture 17 after it has been confirmed that the superconducting cable 12 has reached, over a whole length, a temperature (liquid nitrogen temperature: 77 K) which brings the superconducting cable 12 into a superconducting state. The second fixture 17 may be the one configured to fix the non-fixed end of the superconducting cable 12 to the thermally insulated double pipe. With first and second fixtures, both ends of the superconducting cable 12 are fixed. On this occasion, it may be so arranged that a state of the superconducting cable 12 is confirmed by an X-ray photograph or the like.

Process D (in FIG. 3D)

Temperature raising is started. The superconducting cable 12 is going to get longer in the longitudinal direction due to the temperature raising, but since the both ends of the superconducting cable 12 are fixed by the first fixture 15 and the second fixture 17, the former of the superconducting cable 12 is helically deformed. A state of the superconducting cable may be confirmed by an X-ray photograph or the like after completion of the temperature raising.

CITATION LIST

Patent Literature

[Patent Literature 1]
International Publication No. WO2013/151100
[Patent Literature 2]
International Publication No. WO2015/002200
[Patent Literature 3]
International Publication No. WO2009/145220

Non-Patent Literature

[Non-Patent Literature 1]
Noriko Chikumoto, Hirofumi Watanabe, Makoto Hamabe, Yury Ivanov, Hirohisa Takano, Sataro Yamaguchi, "Demonstration studies of high-temperature superconducting DC power transmission system at Ishikari", CSJ Conference Vol. 90 (2014). 1B-a06, searched on Mar. 25, 2016, Internet <URL: http://csj.or.jp/conference/2014a/1B.pdf>
[Non-Patent Literature 2]
"New Edition-Power Cable Technology Handbook" of second edition supervised by Kihachiro Iizuka, Denkishoin Co., Ltd., pp. 342-343, 2013.

SUMMARY

The temperature raising step in FIG. 3D is executed by introducing, into the thermally insulated double pipe, nitrogen gas whose temperature has been controlled, from one end of the thermally insulated double pipe, for example. In this case, a temperature difference occurs between inflow and exit sides of the nitrogen gas in the thermally insulated double pipe in the temperature raising process illustrated in FIG. 3D, so that the helical deformation of the superconducting cable 12 may not become uniform in the longitudinal direction.

With respect to this phenomenon, it is experimentally found that, as illustrated in FIG. 4, for example, a flow of heat due to the nitrogen gas ($GN_2$) 18 which is introduced into the inner pipe 11 of the thermally insulated double-pipe for the temperature raising does not become uniform in the longitudinal direction of the superconducting cable 12 and pitches and amplitudes of the helical deformation are not uniform in the longitudinal direction. To take an example, heat of the nitrogen gas 18 introduced into the thermally insulated double pipe (inner pipe 11) is lost as the nitrogen gas 18 proceeds in the longitudinal direction. Therefore, each temperature rise at an intermediate portion in the longitudinal direction of the thermally insulated double pipe (inner pipe 11) and on a discharge side (exit side) of the thermally insulated double pipe is lower than a temperature rise on the introduction side (entry side) of the nitrogen gas.

In the example in FIG. 4, a pitch (pitch 1) of the helical deformation of the superconducting cable 12 in a vicinity of the introduction side (entry side) of the nitrogen gas ($GN_2$) in the thermally insulated double pipe is smaller than a pitch (such as a pitch 2) at the intermediate portion in the longitudinal direction or the exit side, and an amplitude (amplitude 1) of the helical deformation in the vicinity of the entry side is larger than an amplitude (such as an amplitude 2) at the intermediate portion in the longitudinal direction and on the exit side. When the helical deformation of the superconducting cable 12 is not uniform in the longitudinal direction as mentioned above, it happens that thermal contraction cannot be sufficiently absorbed at a time of cooling (the above description is based on the findings of the inventor of the present invention). The inventor of the present invention experimentally has confirmed that a large contraction force occurs in the superconducting cable when the cooling is performed again after the helical deformation, for example.

The present invention has been invented in view of the above-mentioned problem. One of objects of the present invention is to provide a method of installing a superconducting cable and a former for making helical deformation during raising temperature uniform in a longitudinal direction of the superconducting cable. The objects other than the above-mentioned object, effects, and so on of the present invention would be clear for a man skilled in the art from the following description.

According to one aspect of the present invention, there is provided a method including: uniformly raising temperature of a superconducting cable over an entirety of the superconducting cable when temperature raising is performed, wherein the superconducting cable assumes a linear shape when cooled and deforms into a helical shape when temperature raising is performed.

According to an aspect of the present invention, there is provided a former of a twisted wire structure, wherein twisting directions of an outermost layer and a layer next to the outer most layer are set to be the same, enabling stabilization of helical deformation of a superconducting cable including the former when temperature raising of the superconducting cable is performed. According to an aspect of the present invention, there is provided a superconducting cable including the former.

According to the present invention, a helical deformation of a superconducting cable during temperature raising can be made uniform in a longitudinal direction. Further, according to the present invention, there are provided a former that enables stabilization of helical deformation of a superconducting cable during temperature raising and a superconducting cable including the former.

DETAILED DESCRIPTION

First, the technical concept of the present invention will be described, and then, example embodiments will be described.

In one aspect of the present invention, uniform temperature raising over an entirety of a superconducting cable that assumes a linear shape when being cooled, is performed to make helical deformation of the superconducting cable uniform in the longitudinal direction thereof.

In one aspect of the present invention, the temperature raising may be performed with both ends of the superconducting cable fixed.

In one aspect of the present invention, the following may be performed:

evacuating a thermally insulated double pipe including an inner pipe adapted to house the superconducting cable therein and an outer pipe housing the inner pipe therein;

inserting the superconducting cable into the inner pipe at room temperature, with one end of the superconducting cable fixed, the one end protruding from an end portion of the inner pipe of the thermally insulated double pipe and with the other end of the superconducting cable set to a free end, cooling the superconducting cable to a temperature that brings the superconducting cable into a superconducting state; and then fixing the both ends of the superconducting cable.

In one aspect of the present invention, when temperature raising is performed, gas for temperature raising is not flown into the thermally insulated double pipe, but heat is entered from an entirety of the thermally insulated double pipe, as a result of which temperature of the superconducting cable is uniformly raised over a longitudinal direction of the superconducting cable.

In one aspect of the present invention, a degree of vacuum in a gap between the inner pipe and the outer pipe of the thermally insulated double pipe to be evacuated by a vacuum pump may be lowered to reduce thermal insulation performance, thereby uniformly raising temperature of the superconducting cable over at least a longitudinal direction of the superconducting cable. As an alternative method, when the temperature raising is executed for a long period of time without lowering a degree of vacuum, heat substantially uniformly enters into the thermally insulated double pipe.

In one aspect of the present invention, after the superconducting cable has been cooled to the temperature that brings the superconducting cable into the superconducting state with the one end of the superconducting cable fixed and the other end of the superconducting cable set to the free end, the fixation of the one end may be relaxed and the superconducting cable is pressed into the inner pipe of the thermally insulated double pipe from the one end whose fixation has been relaxed.

In one aspect of the present invention, when fixing respectively one end and the other end of superconducting cable, the one end and the other end of the superconducting cable may be respectively fixed to the thermally insulated double pipe by fixtures.

Figure 1:
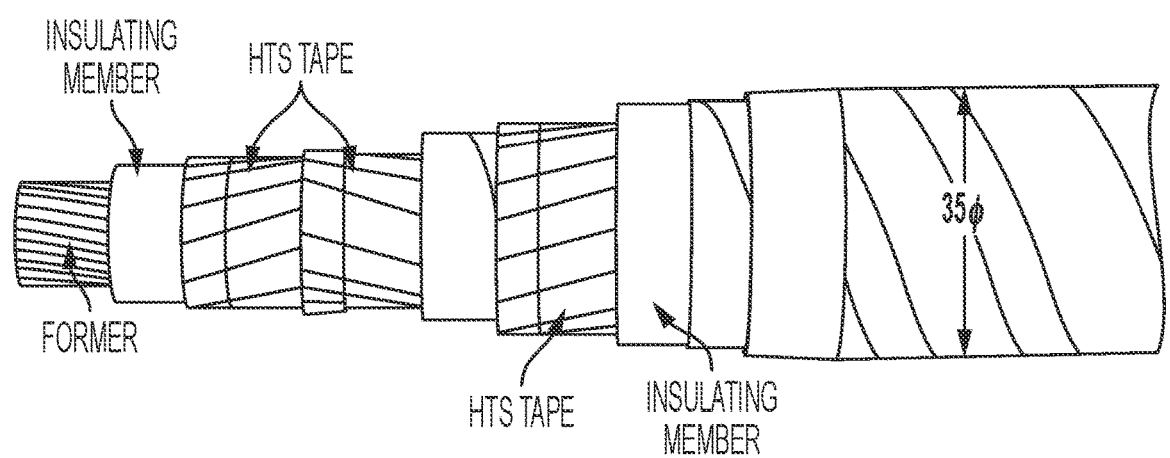
FIG. 1 is a photograph illustrating a superconducting cable.
Figure 2A:
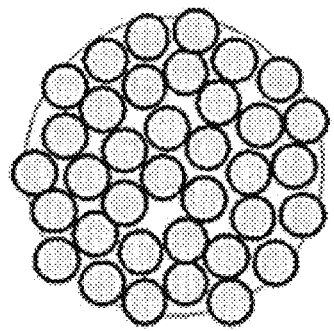
FIG. 2A includes diagrams each illustrating a section of a twisted wire structure for the superconducting cable.
Figure 2A:
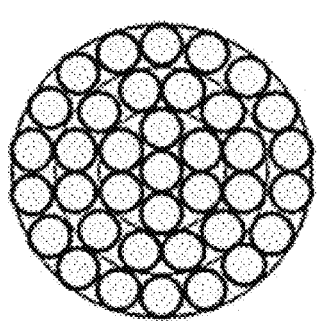
Figure 2A:
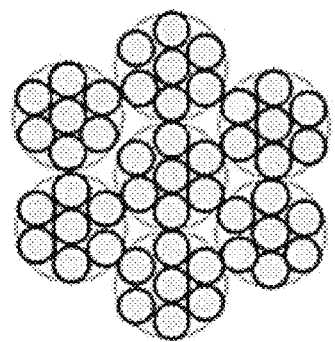
Figure 2B:
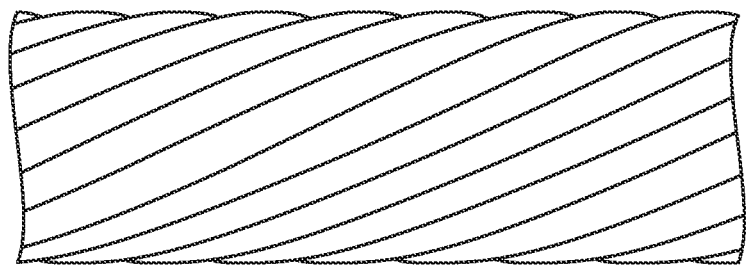
FIG. 2B is a photograph illustrating a side surface of the superconducting cable.

According to one aspect of the present invention, there is provided a former, wherein twisting directions of an outermost layer and a layer next to the outer most layer are set to be the same in the twisted wire structure of the former illustrated in FIG. 2B, thereby enabling stabilization of helical deformation of a superconducting cable when temperature raising of the superconducting cable is performed. Further, there is provided a superconducting cable including the former.

EXAMPLE EMBODIMENTS

Figure 3A:
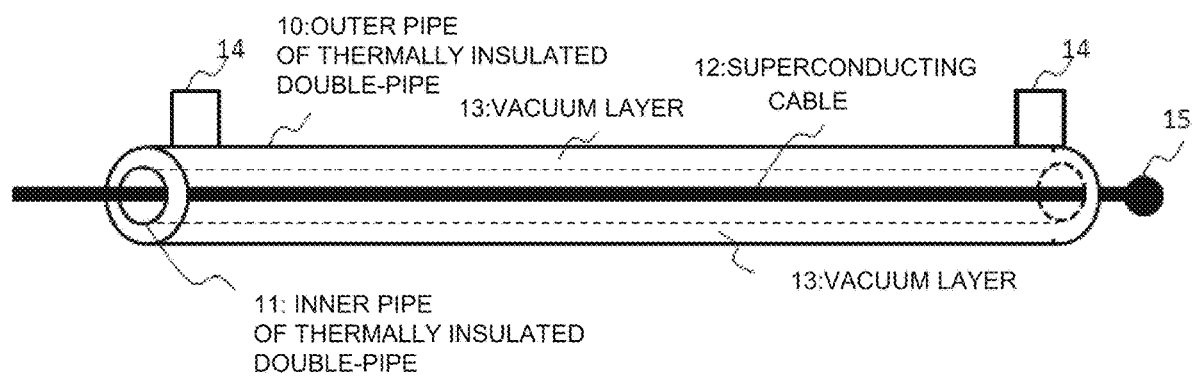
FIG. 3A is a diagram illustrating a process for installation of the superconducting cable.
Figure 3B:
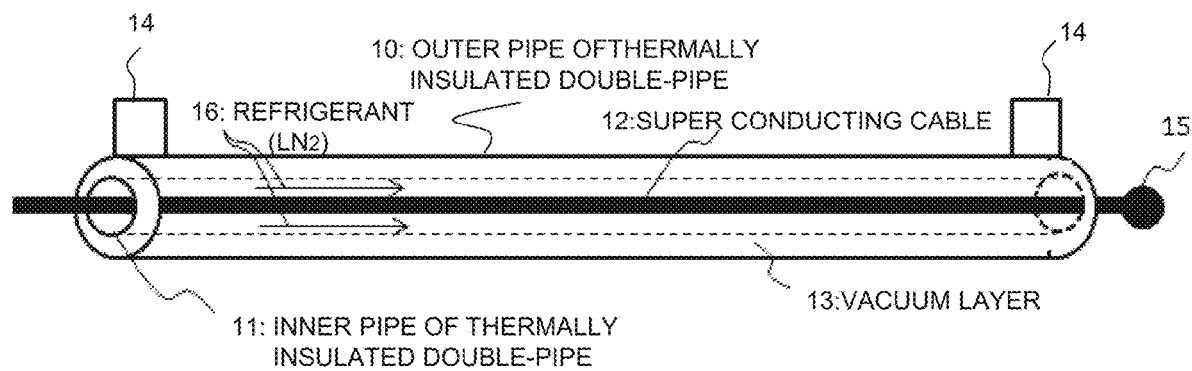
FIG. 3B is a diagram illustrating a process for the installation of the superconducting cable.
Figure 3C:
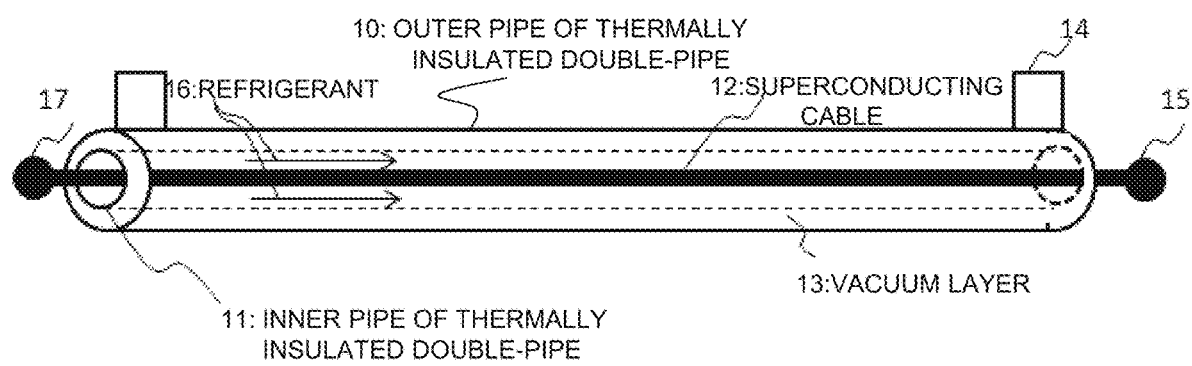
FIG. 3C is a diagram illustrating a process for the installation of the superconducting cable.

In an installation method in one example embodiment of the present invention, the above-mentioned process from FIG. 3A to FIG. 3C may be employed for process before a temperature raising process. A thermally insulated double pipe that includes an inner pipe 11 adapted to house a superconducting cable 12 therein and an outer pipe 10 housing the inner pipe 11 therein, is evacuated.

Then, the superconducting cable 12 is inserted into the inner pipe 11 of the thermally insulated double-pipe at room temperature. One end of the superconducting cable 12 that has protruded from an end portion of the inner pipe 11 of the thermally insulated double-pipe is fixed, and the other end of the superconducting cable 12 is set to a free end.

After the superconducting cable 12 has been cooled to a temperature (liquid nitrogen temperature of 77K) that brings the superconducting cable 12 into a superconducting state, the free end of the superconducting cable 12 is fixed (or both of the ends are thus fixed).

Figure 3D:
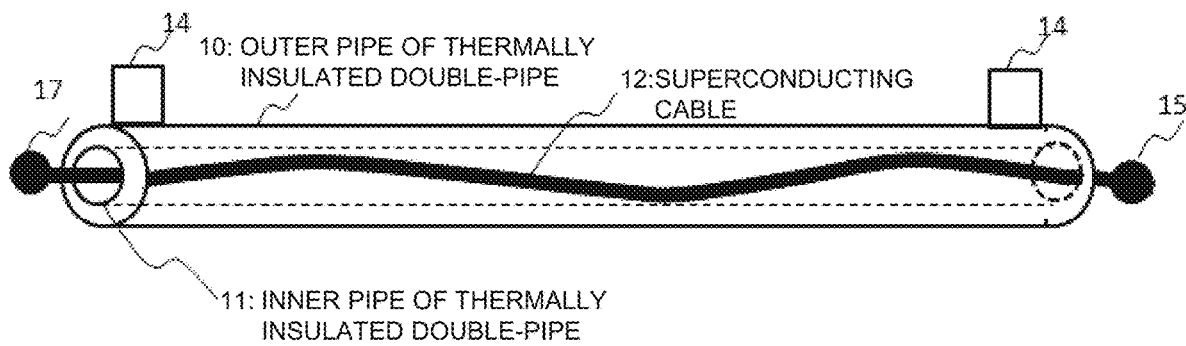
FIG. 3D is a diagram illustrating a process for the installation of the superconducting cable.
Figure 4:
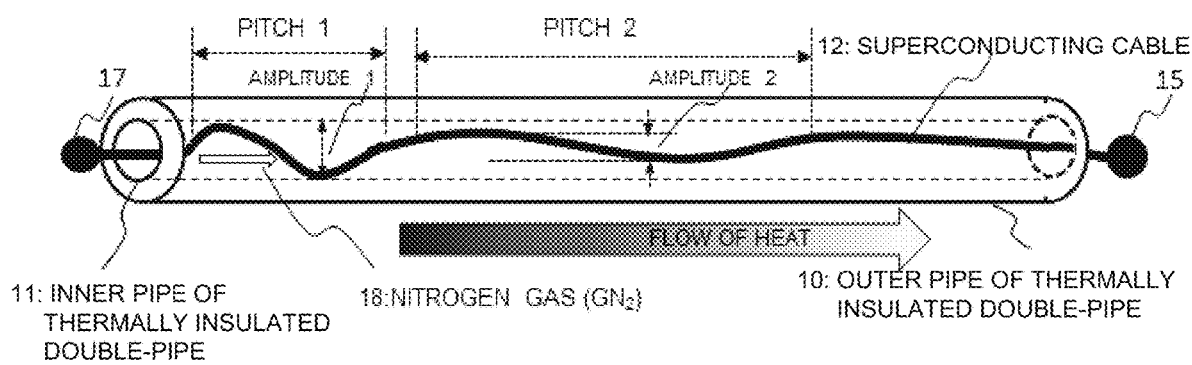
FIG. 4 is a diagram explaining FIG. 3D.

In the one example embodiment of the present invention, nitrogen gas whose temperature has been adjusted is not flown from one end of the thermally insulated double-pipe in the temperature raising process in FIG. 3D, in order to make helical deformation of the superconducting cable uniform in a longitudinal direction.

Figure 5:
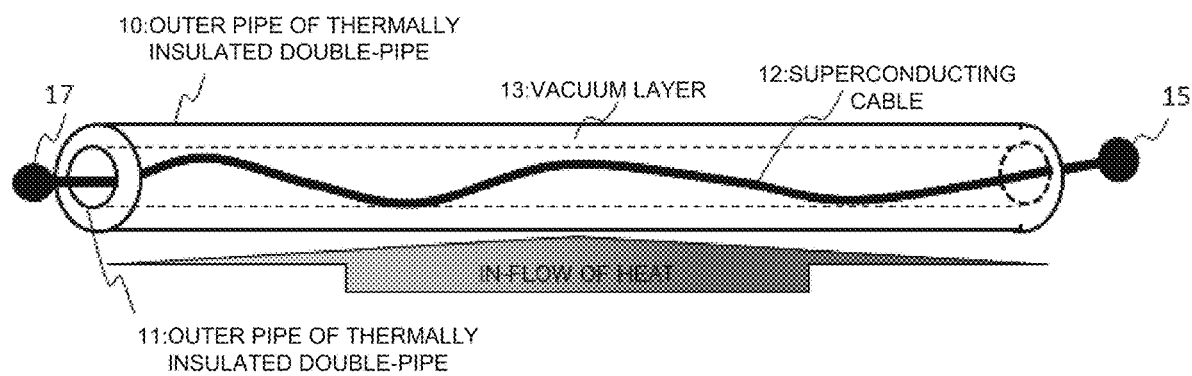
FIG. 5 is a diagram explaining one example embodiment of the present invention.

After a lapse of a long period of time, without flowing the nitrogen gas, heat enters from the entirety of the thermally insulated double pipe, as schematically illustrated in FIG. 5, so that temperature raising is accomplished substantially uniformly in the longitudinal direction of the superconducting cable 12.

Further, a degree of vacuum of a vacuum layer 13 of the thermally insulated double-pipe that is a gap between the inner pipe 11 housing the superconducting cable 12 therein and the outer pipe 10 may be lowered. As a result, insulation performance of the thermally insulated double pipe is reduced. When the insulation performance of the thermally insulated double pipe is reduced, temperature raising of the superconducting cable 12 inserted into the thermally insulated double-pipe is accomplished in a shorter period of time. That is, heat enters into the entirety of the inner pipe 11 of the thermally insulated double-pipe, so that a temperature rise is accomplished substantially uniformly in the longitudinal direction of the superconducting cable 12. This makes (pitches and amplitudes of) the helical deformation uniform in the longitudinal direction of the superconducting cable 12.

Figure 6:
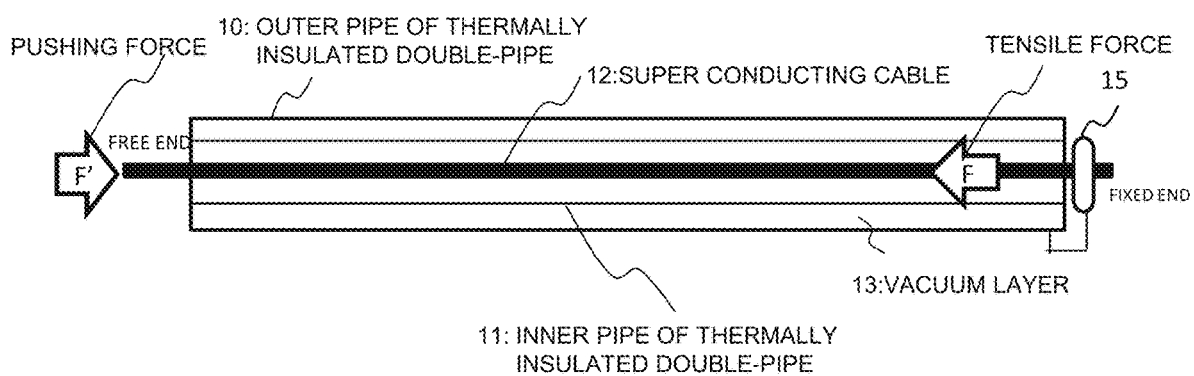
FIG. 6 is a diagram explaining the one example embodiment of the present invention.

When a refrigerant (liquid nitrogen) is introduced into the inner pipe 11 of the thermally insulated double-pipe in the cooling process in FIG. 3B, a tensile force (tensile stress) F is generated at the fixed end of the superconducting cable 12 (end portion fixed by a first fixture 15 in FIG. 3B) due to contraction. Since the other end (free end) of the superconducting cable 12 is not fixed in FIG. 3B, no tensile force is generated. Therefore, a thermal stress in the length direction is generated in the superconducting cable 12, as schematically illustrated in FIG. 6.

In this example embodiment, in order to relax the thermal stress that is generated in the superconducting cable 12 during cooling, fixation of the fixed end (end portion connected to the first fixture 15) is temporarily relaxed when a minimum temperature for the cooling has reached, and the superconducting cable 12 is pushed into the inner pipe 11 of the thermally insulated double-pipe from a side where the fixation has been relaxed.

Pushing the superconducting cable 12 into the inner pipe 11 of the thermally insulated double-pipe from the side of the fixed end whose fixation has been relaxed as mentioned above is to reduce a stress that remains after the superconducting cable 12 has been drawn in the inner pipe 11 of the thermally insulated double-pipe and cooled.

By setting a pushing force F' on this occasion such that F'>F, the tensile force on the side of the fixed end of the superconducting cable 12 is reduced to be zero or less (F−F'<0).

Hereinafter, a description will be given about the reason for pushing the superconducting cable 12 into the inner pipe 11 of the thermally insulated double-pipe from the side of the one end (fixed end) whose fixation has been relaxed.

As described above, in the graph (2) in FIG. 11, the stress in the left half (X (length)=0~$L_0$/2) of the superconducting cable 12 remains, and it takes a maximum value which is the value of the stress (=−$\sigma_0$) at the end portion (X (length)=0) when the superconducting cable 12 is drawn in. Accordingly, it is desirable to relax this stress.

In order to achieve this relaxation, the fixed end side (fixed end 15 in FIG. 6) of the superconducting cable 12 is unfixed and set to a free end, when the cooling is performed and the low temperature is reached. Then, the superconducting cable is pushed into the inner pipe 11 of the thermally insulated double-pipe, thereby enabling elimination of the stress in the end portion (end portion in FIG. 6).

Figure 11:
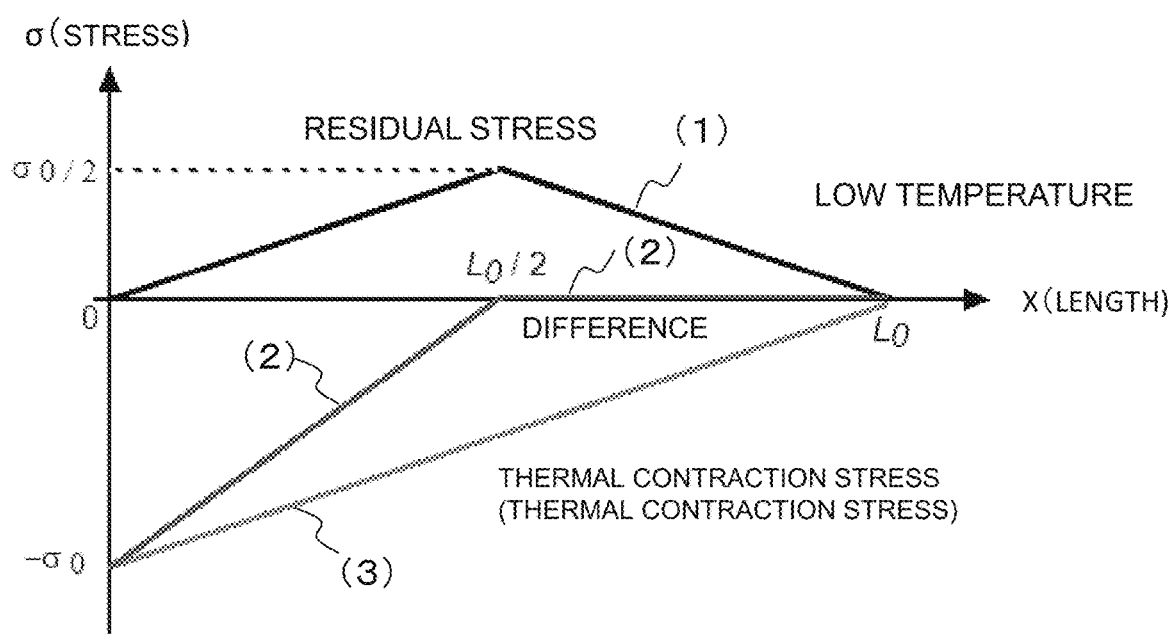
FIG. 11 includes graphs illustrating a stress (residual stress) distribution in the cable when held at a low temperature, a stress (residual stress) distribution in the cable when the cable with zero (zero) stress is cooled and held at a low temperature, and a stress (residual stress) distribution in the cable when a force to act on the cable after drawing of the cable into the pipe made zero.

However, as illustrated in the graph (2) in FIG. 11, the stress in the superconducting cable 12 takes a negative value. Thus, actually, the superconducting cable 12 is in a state of being drawn in without applying a force from an outside. But, this is technically not easy. That is because the work is to be performed in a situation where the superconducting cable 12 and the pipe (the inner pipe 11 of the thermally insulated double-pipe) are being cooled at the liquid nitrogen temperature.

Further, it is not advisable to push the superconducting cable 12 too much. Then, this pushing work needs to be performed while monitoring the pushing force F' by a load cell.

Therefore, the pushing work of is performed by contriving a jig to be attached to the pipe. As a result, a distribution as illustrated in a graph (2) in FIG. 12 can be obtained, as a residual stress distribution in the superconducting cable 12. In the graph (2) in FIG. 12, a stress at the end portion (X (length)=0) is zero. Even if the stress at the end portion is zero, there is a friction force, so that there remains a stress in an entirety of the cable. However, the stress as a whole can be greatly reduced from that corresponding to thermal contraction of 0.3%, because this graph indicates that, as a maximum stress, the stress after the cable has been drawn in the intermediate portion of the cable remains.

After the above-mentioned work has been finished, both ends of the superconducting cable 12 are fixed to the thermally insulated double pipe, and temperature raising is executed. This causes the superconducting cable 12 to helically deform.

Figure 10:
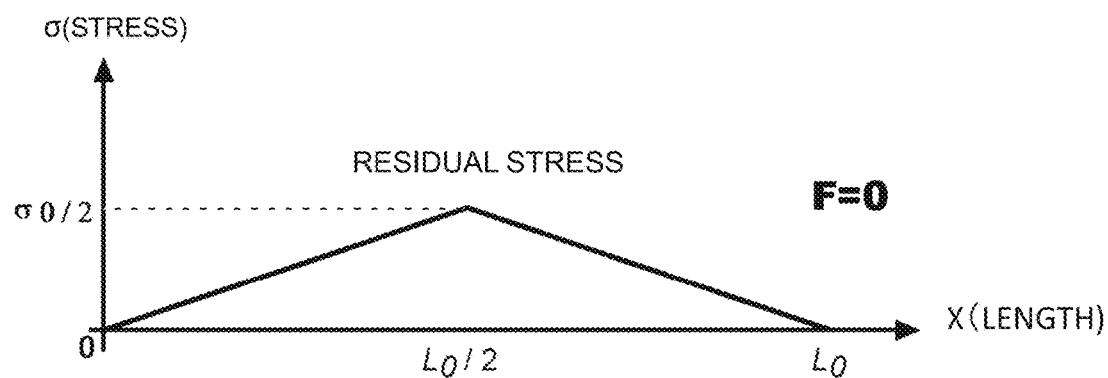
FIG. 10 is a graph illustrating a stress (residual stress) distribution in the cable when a force to act on the cable after drawing of the cable into the pipe is made zero (zero).
Figure 12:
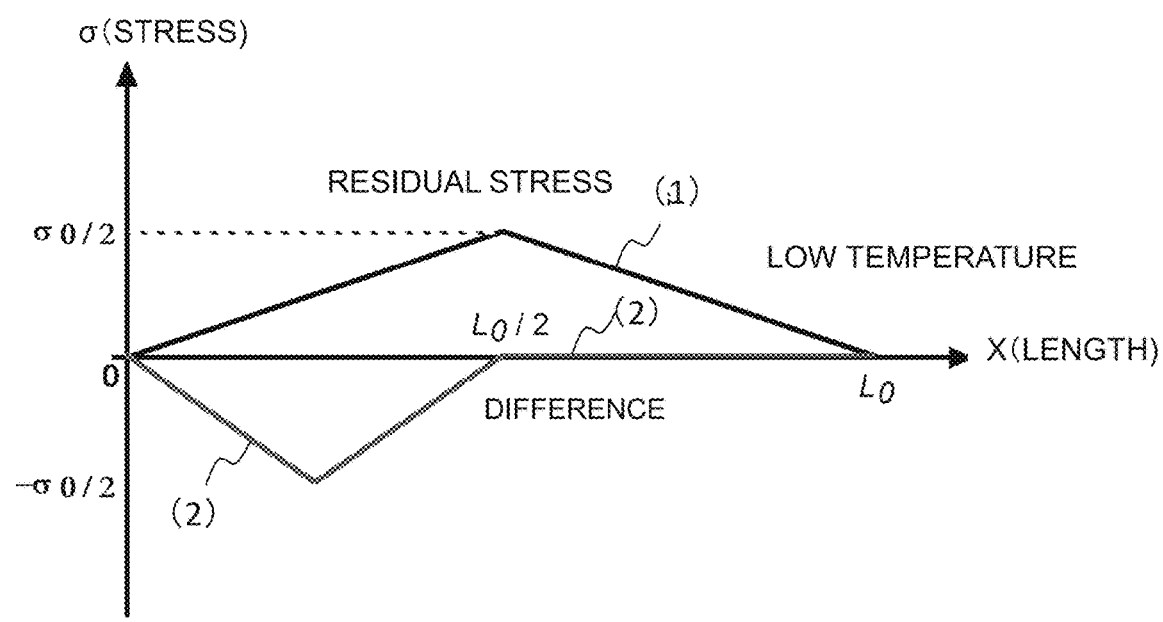
FIG. 12 includes graphs illustrating a stress distribution when a fixed end side of a cable held at a low temperature is pressed in and a stress (residual stress) distribution in the cable when a force to act on the cable after drawing of the cable into the pipe made zero (zero).

The examples in FIG. 12 illustrate distributions when a stress at the fixed end (X (length)=0) is set to zero, or the pushing force F' of the superconducting cable 12 into the pipe (the inner pipe 11 of the thermally insulated double-pipe) is set to zero. The graph (2) in FIG. 12 is a graph illustrating the stress distribution when the fixed end side of the superconducting cable 12 held at the low temperature is pushed in, and a graph (1) is a graph illustrating a stress (residual stress) distribution (in FIG. 10) in the cable when a force to act on the superconducting cable 12 after the superconducting cable 12 has been drawn in the pipe (thermally insulated double-pipe inner pipe 11) is made zero.

The pushing force F' of the superconducting cable 12 may be slightly increased to push the superconducting cable 12 more into an inside of the inner piper 11 of the thermally insulated double pipe. Then, the stress in the superconducting cable 12 as the whole is more relaxed. However, it is necessary to take care because an extrusion force at the end portion of the superconducting cable 12 is increased when the temperature raising is executed.

With respect to the first fixture 15, extension and contraction of the superconducting cable 12 may be absorbed by an elastic member or a metal fixture with a sliding function, for example, as described in Patent Literature 3 such that the thermal stress in a length direction of the superconducting cable 12 may be relaxed. Extension of the superconducting cable 12 when temperature is raised may be absorbed by a movable terminal cryostat (see Patent Literature 1).

Figure 7A:
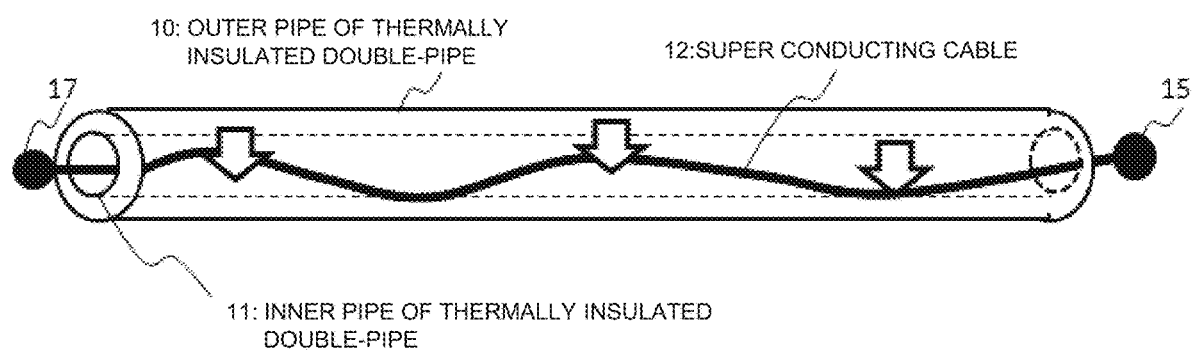
FIG. 7A is a diagram explaining a different example embodiment of the present invention.

After the work for the helical deformation to be caused by temperature raising from the low temperature to room temperature has been finished, the both ends of the superconducting cable 12 are fixed and held, as illustrated in FIG. 7A.

This operation is performed because a mechanical deformation as mentioned above is accompanied by a friction and so on, so that the deformation is not necessarily stable.

Actually, when cooling and temperature raising of the superconducting cable 12 are performed a plurality of times, the superconducting cable 12 slightly changes for each time. Experimentally, when cooling and temperature raising of the superconducting cable 12 are performed approximately four times, the cable shape at room temperature and the cable shape at the low temperature seem to be comparatively stabilized.

However, since friction is accompanied, complete reproductivity, in principle, cannot be achieved in an elongated structure such as the superconducting cable.

The superconducting cable 12 is retained in a state of the helical deformation. In connection work or the like for the end of the superconducting cable 12, an end portion is processed. That is, when an operation for connection of the superconducting cable 12 or the like is executed, the operation cannot be smoothly executed if the superconducting cable 12 moves, and as a result, it may even happen that operation efficiency is remarkably reduced.

Figure 7B:
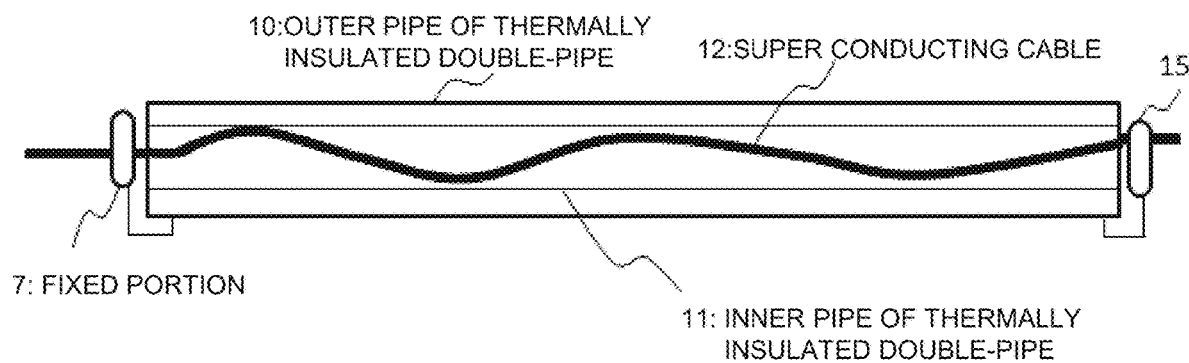
FIG. 7B is a diagram explaining a different example embodiment of the present invention.
Figure 8:
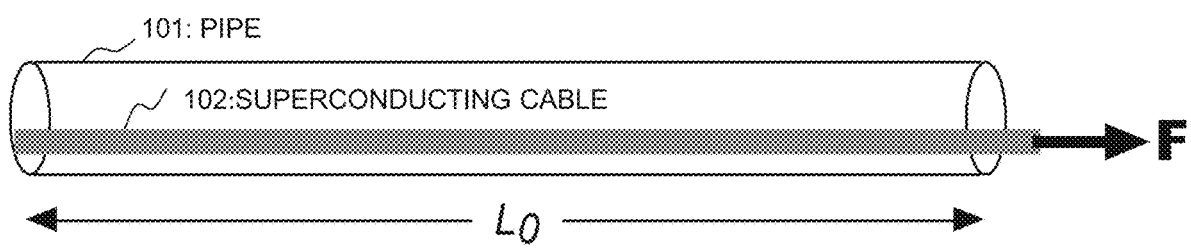
FIG. 8 is a diagram schematically describing a state of drawing a cable into a pipe.
Figure 9:
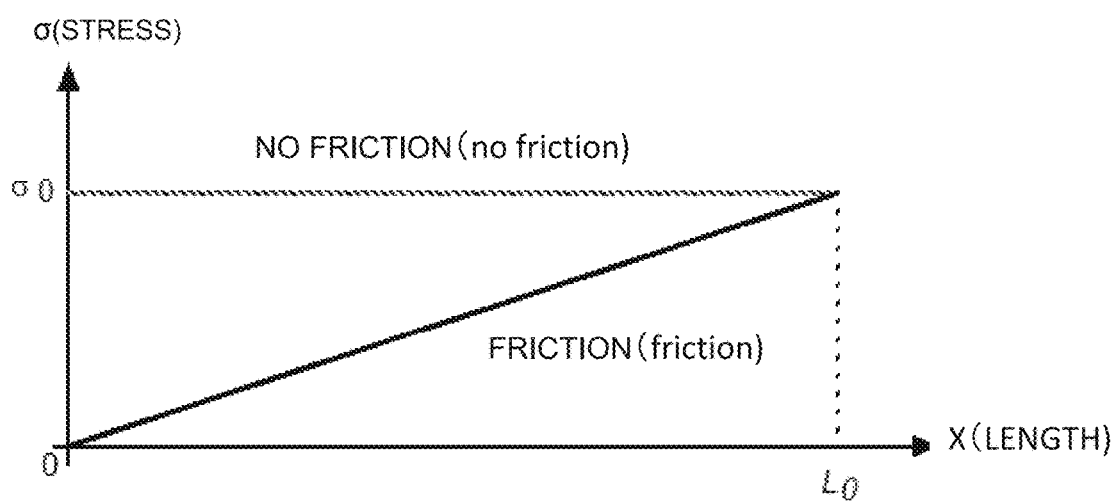
FIG. 9 is a graph illustrating a relationship of a drawing-in distance of the cable with respect to a stress distribution.

Then, as schematically illustrated in FIG. 7B, a portion of the superconducting cable 12 close to the end portion of the superconducting cable 12 is fixed to the thermally insulated double pipe or the like, using a second fixture 17, for example, thereby preventing the movement of the superconducting cable 12. That is, when the operation for the connection of the superconducting cable 12 is executed, the progress of the work may be delayed if the superconducting cable moves. For this reason, a portion close to the end portion of the superconducting cable 12 is held, thereby preventing collapse of the state (of pitches and amplitudes) of the helical deformation of the superconducting cable 12. In the example in FIG. 7B, the second fixture 17 is fixed to the thermally insulated double pipe (outer pipe 10). However, the second fixture 17, as a matter of course, may be fixed to a different location or the like.

In the former of the structure of concentric twisted wires in the superconducting cable 12, a twisting direction is reversed for each layer, thereby preparing the former to be difficult to be twisted as a whole. However, twisting directions of an outermost layer and a layer next to the outer most layer are set to be the same in order to make the superconducting cable 12 deform into a helical shape during a temperature raising process. This stabilizes a twisting direction (leading to the helical deformation).

A support member(s) or the like, as a matter of course, may be provided between the inner pipe and the outer pipe of the thermally insulated double-pipe. A radiation shield configured to prevent heat intrusion may be provided between the inner pipe and the outer pipe. It may be so configured that the radiation shield is formed by combining a plurality of annular members (aluminum extrusion members), for example, and a multilayer insulation (MLI) is wound over the plurality of annular members.

Each disclosure of the above-listed Patent Literatures 1 to 3 and Non Patent Literatures 1 and 2 is incorporated herein by reference. Modification and adjustment of each example embodiment and each example are possible within the scope of the overall disclosure (including the claims) of the present invention and based on the basic technical concept of the present invention. Various combinations and selections of various disclosed elements (including each element of each claim, each element of each example, each element of each drawing, and so on) are possible within the scope of the claims of the present invention. That is, the present invention naturally includes various variations and modifications that could be made by those skilled in the art according to the overall disclosure including the claims and the technical concept.

The invention claimed is:

1. A method of installing a superconducting cable, the method comprising:
   evacuating a thermally insulated double pipe including an inner pipe adapted to house the superconducting cable therein and an outer pipe housing the inner pipe therein;
   inserting the superconducting cable into the inner pipe at room temperature;
   cooling the superconducting cable to temperature that brings the superconducting cable into a superconducting state, with one end of the superconducting cable protruding from an end portion of the inner pipe of the thermally insulated double pipe fixed and with the other end of the superconducting cable set to a free end;
   fixing the both ends of the superconducting cable;
   relaxing fixation of the one end after the superconducting cable has been cooled to the temperature that brings the superconducting cable into the superconducting state and pushing the superconducting cable into the inner pipe of the thermally insulated double pipe from the one end, the fixation thereof being relaxed; and
   uniformly raising temperature of the superconducting cable over an entirety thereof, during temperature raising, the superconducting cable assuming a linear shape when cooled, while deforming into a helical shape when temperature raising is performed.

2. The method according to claim 1, comprising:
   performing the temperature raising with both ends of the superconducting cable fixed.

3. The method according to claim 1, comprising: when the temperature raising is performed, heat is entered from an entirety of the thermally insulated double pipe, and the temperature of the superconducting cable is uniformly raised over at least a longitudinal direction, without flowing gas for the temperature raising into the thermally insulated double pipe.

4. The method according to claim 1, comprising:
   lowering a degree of vacuum in a vacuum layer that is a gap between an outside of the inner pipe and an inside of the outer pipe in the thermally insulated double pipe to reduce thermal insulation performance to uniformly raise the temperature of the superconducting cable over the at least the longitudinal direction of the superconducting cable.

5. The method according to claim 1, comprising:
   when fixing the one end and the other end of superconducting cable, respectively fixing the one end and the other end of the superconducting cable to the thermally insulated double pipe by fixtures.

6. The method according to claim 1, comprising:
   fixing the both ends of the cable after the temperature raising to cause the superconducting cable to helically deform is performed.

7. The method according to claim 1, wherein the superconducting cable comprises:
   a former of a twisted wire structure;
   wherein the former includes an outermost layer and a layer next to the outer most layer, both of the layers having twisting directions set to be the same to enable stabilization of helical deformation of the superconducting cable when temperature raising of the superconducting cable is performed.

8. A method of installing a superconducting cable, the method comprising:
   evacuating a thermally insulated double pipe including an inner pipe adapted to house the superconducting cable therein and an outer pipe housing the inner pipe therein;
   inserting the superconducting cable into the inner pipe at room temperature;
   cooling the superconducting cable to temperature that brings the superconducting cable into a superconducting state, with one end of the superconducting cable protruding from an end portion of the inner pipe of the thermally insulated double pipe fixed and with the other end of the superconducting cable set to a free end;
   fixing the both ends of the superconducting cable;
   lowering a degree of vacuum in a vacuum layer that is a gap between an outside of the inner pipe and an inside of the outer pipe in the thermally insulated double pipe to reduce thermal insulation performance to uniformly raise the temperature of the superconducting cable over the at least the longitudinal direction of the superconducting cable; and
   uniformly raising temperature of the superconducting cable over an entirety thereof, during temperature raising, the superconducting cable assuming a linear shape when cooled, while deforming into a helical shape when temperature raising is performed.

* * * * *